(12) United States Patent
Hashimoto

(10) Patent No.: US 7,046,592 B2
(45) Date of Patent: May 16, 2006

(54) OPTICAL DISK REPRODUCING APPARATUS

(75) Inventor: Chiaki Hashimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 416 days.

(21) Appl. No.: 10/460,313

(22) Filed: Jun. 13, 2003

(65) Prior Publication Data

US 2003/0231562 A1    Dec. 18, 2003

(30) Foreign Application Priority Data

Jun. 17, 2002    (JP)    ............................ P2002-176067

(51) Int. Cl.
*G11B 7/00*    (2006.01)
(52) U.S. Cl. .............................. 369/44.28; 369/44.34; 369/47.36; 369/53.28
(58) Field of Classification Search .................... None
See application file for complete search history.

(56) References Cited

FOREIGN PATENT DOCUMENTS

| JP | 7-032740 | 6/1995 |
|---|---|---|
| JP | 2000-125588 | 4/2000 |
| JP | 2001-078483 | 3/2001 |

*Primary Examiner*—Muhammad Edun
(74) *Attorney, Agent, or Firm*—Morgan, Lewis & Bockius LLP

(57) ABSTRACT

When a run-away phenomenon of an optical disk occurs, a control circuit detects a rotational direction of the optical disk that runs away by comparing an initial track count value and a braking time track count value. The initial track count value is a value calculated by counting track pulses corresponding to a tracking error signal for a predetermined time when a tracking servo is turned off. The braking time track count value is a value calculated by counting the track pulses corresponding to the tracking error signal for a predetermined time, when a brake pulse is applied to the spindle motor.

5 Claims, 4 Drawing Sheets

OPTICAL DISK REPRODUCING APPARATUS

BACKGROUND OF THE INVENTION

1. Field of the Invention

The present invention relates to an optical disk reproducing apparatus for reproducing information recorded on an optical disk, and more particularly to controlling of a spindle motor for rotating the optical disk.

2. Description of the Related Art

In an optical disk reproducing apparatus, a spindle motor for rotating an optical disk is controlled with a motor control signal generated on the basis of a synchronizing signal (frame sync) included in a reproducing signal output from an optical pickup in reproducing the optical disk. More particularly, the control for the spindle motor is made through a servo loop with PLL (Phase Locked Loop), and the motor control signal to the spindle motor is given by a voltage corresponding to a phase difference between the synchronizing signal and a preset reference signal, whereby the rotation of the spindle motor is controlled.

When reproducing information recorded on the optical disk, a predetermined voltage is firstly applied to the spindle motor and the optical disk begins to rotate by the rotation of the spindle motor. A phase comparison is made between the synchronizing signal included in the reproducing signal from the optical pickup and the preset reference signal, whereby the spindle motor is accelerated up to a predetermined range of rotational frequency. When the predetermined rotational frequency is reached, the servo loop with PLL is locked. When the servo loop with PLL cannot be locked due to some cause since the rotation of the spindle motor is accelerated, the rotational frequency of the spindle motor abnormally increases, resulting in a run-away phenomenon of the optical disk, which is turned in an uncontrolled state of the rotation.

For example, when the optical disk is reproduced by switching from one side to another, the rotation of the spindle motor is accelerated, until the optical pickup is moved to a reproducing position on the optical disk. Therefore, the rotational frequency of the spindle motor is increased, as the optical pickup reaches a positive position for a longer time, so that the optical disk is accelerated beyond a specified rotational frequency and the run-away phenomenon of the optical disk occurs.

Also, for example, when an outgoing beam from the optical pickup gets out of an effective recording area of the optical disk and enters a mirror face that has no tracks formed, the synchronizing signal cannot be detected so that the servo loop with PLL becomes disabled. As a result, the rotation of the spindle motor is accelerated to cause the optical disk to run away.

As conventional techniques for controlling the optical disk to be stopped when the run-away phenomenon of the optical disk occurs, there has been disclosed an optical disk player as disclosed in JP-A-7-032740, a DC motor control device as disclosed in JP-A-2000-125588, and a DC spindle motor speed detecting device as disclosed in JP-A-2001-078483. However, the conventional techniques includes following problems.

The optical disk player as disclosed in JP-A-7-032740 includes run-away sensing means for sensing a run-away of the spindle motor that drives the rotation of the optical disk, rotational direction sensing means for sensing the rotational direction of the spindle motor that runs away, and brake signal supplying means for supplying a brake signal having a polarity according to an output of the rotational direction sensing means to the spindle motor, whereby a run-away phenomenon of the optical disk is prevented by suppressing the spindle motor from running away.

However, the run-away sensing means senses a run-away of the spindle motor by detecting an electric current from the spindle motor, and the rotational direction sensing means senses the rotational direction of the spindle motor on the basis of an output voltage from the run-away sensing means. That is, the run-away sensing means employs the electric current for sensing, and the rotational direction sensing means employs a voltage for sensing. Therefore, the sensing operation is not necessarily stable, because that the electric current or voltage is likely to fluctuate depending on the operating condition.

The DC motor control device as disclosed in JP-A-2000-125588 includes intermittent braking voltage supplying means for intermittently supplying to a DC motor (corresponding to the spindle motor) a braking voltage having a polarity capable of electrically braking the DC motor, rotational direction determining means for determining the rotational direction of the DC motor by detecting the polarity of counter electromotive force of the DC motor during a period where no braking voltage is supplied to the DC motor, and control means for determining whether or not the rotational direction of the DC motor is reversed during a stop control period of the DC motor and stopping the supply of the intermittent braking voltage to the DC motor when the rotational direction is reversed, whereby a run-away phenomenon of the optical disk is prevented by suppressing the DC motor from running away.

However, the rotational direction determining means detects the polarity of counter electromotive force of the DC motor, but because the voltage of counter electromotive force is considerably low, and the voltage level of counter electromotive force is constant, it is difficult to stabilize the determining operation by the control means.

The DC spindle motor speed detecting device as disclosed in JP-A-2001-078483 includes a current/voltage converter for converting an electric current supplied to the spindle motor into a voltage, an analog/digital converter for converting an analog voltage converted by the current/voltage converter into a digital signal, and a control section for making the spindle motor control in accordance with the rotational speed of the spindle motor that is detected on the basis of the digital signal converted by the analog/digital converter, whereby a run-away phenomenon of the optical disk is prevented by suppressing the spindle motor from running away.

However, in technique described in JP-A-2001-078483, the rotational direction of the spindle motor is detected, employing a voltage based on a current applied to the spindle motor, but because the current is likely to fluctuate depending on the load condition, it is difficult to always stabilize the operation for detecting the rotational direction of the optical disk that runs away.

In addition to the conventional techniques as described above, there is a well known technique that when the optical disk runs away, a timer starts to measure time, and the operation is compulsorily turned in a stop mode after the elapse of a fixed time. However, the technique above has a problem that it takes a long-time to turn to the stop mode, and when the optical disk is reversely rotated and a brake signal in a direction of positive rotation is applied to the spindle motor, the optical disk is further accelerated in the opposite rotational direction, and not being stopped.

SUMMARY OF THE INVENTION

It is therefore an object of the invention to provide an optical disk reproducing apparatus capable of detecting the rotational direction of the optical disk promptly and thereby stopping securely the optical disk without detecting the current or voltage level of the spindle motor, when a run-away phenomenon of the optical disk occurs because the spindle motor runs away.

In order to achieve the above object, according to a first aspect of the invention, there is provided an optical disk reproducing apparatus including: a spindle motor adapted to rotate an optical disk; an optical pickup adapted to emit a laser beam for reproducing information recorded on the optical disk, to receive a reflected light from the optical disk and to output a reproducing signal; a tracking servo-off section adapted to turn off a tracking servo that controls a tracking of the optical pickup after confirming that a focus of the laser beam on said optical pickup is normally set on the basis of a focus error signal included in the reproducing signal; a first count value calculating section adapted to calculate an initial track count value by counting, for a predetermined time, tracking pulses corresponding to a tracking error signal included in the reproducing signal, when the tracking servo-off section turns off the tracking servo; a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor; a rotational direction detecting section adapted to detect a rotational direction of the optical disk by comparing the initial track count value calculated by the first count value calculating section and the braking time track count value calculated by the second count value calculating section; and a control circuit adapted to control the spindle motor on the basis of a synchronizing signal included in the reproducing signal, wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated.

In order to achieve the above object, according to a second aspect of the invention, there is provided an optical disk reproducing apparatus including: a spindle motor adapted to rotate an optical disk; an optical pickup adapted to emit a laser beam for reproducing information recorded on the optical disk, to receive a reflected light from the optical disk and to output a reproducing signal; and a control circuit adapted to control the spindle motor on the basis of a synchronizing signal included in the reproducing signal, wherein when the spindle motor is accelerated and the optical disk runs away, the control circuit detects a rotational direction of the optical disk based on a track relevant information output from the optical pickup and applies a brake signal to the spindle motor in a direction opposite to the detected rotational direction of the optical disk.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
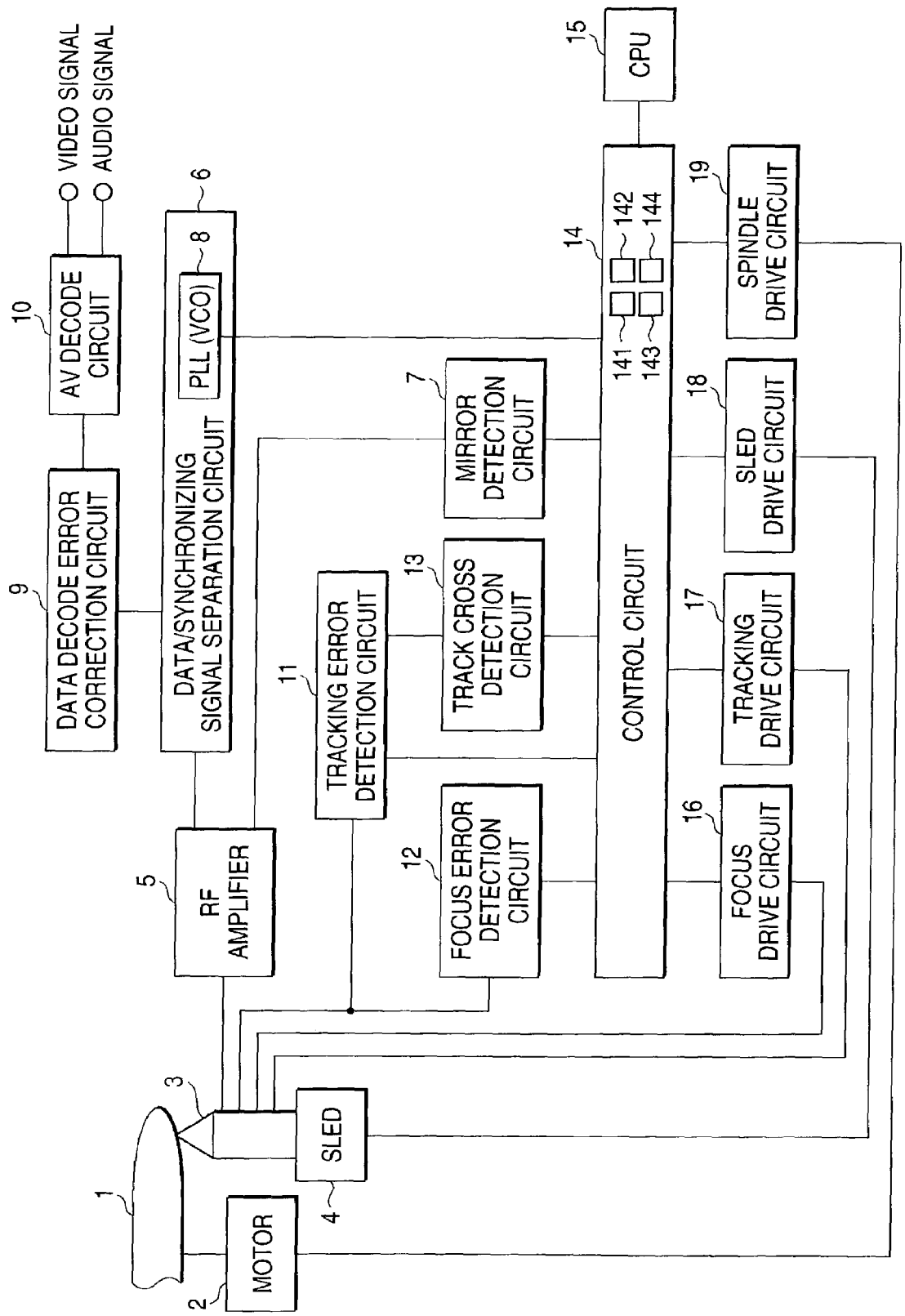
FIG. 1 is a block diagram showing a configuration of an optical disk reproducing apparatus according to one embodiment of the present invention.

FIG. 1 is a block diagram showing a configuration of an optical disk reproducing apparatus according to one embodiment of the present invention. As shown in FIG. 1, the optical disk reproducing apparatus includes an optical pickup 3 for emitting a laser beam to reproduce information recorded on an optical disk 1 (recording medium) and receiving a reflected light from the optical disk 1, a spindle motor 2 for rotating the optical disk 1, a spindle drive circuit 19 for driving the spindle motor 2, a tracking drive circuit 17 for driving a tracking actuator of the optical pickup 3 by applying a tracking servo, a focus drive circuit 16 for driving a focus actuator of the optical pickup 3 by applying a focus servo, a sled 4 for moving the optical pickup 3 in a radial direction of the optical disk 1, and a sled drive circuit 18 for driving the sled 4.

The optical disk reproducing apparatus further includes an RF amplifier 5 for amplifying an RF signal produced from a reproducing signal (read signal) input from the optical pickup 3 in reproducing the optical disk 1, a data/synchronizing signal separation circuit 6 for separating data and a synchronizing signal from the RF signal input from the RF amplifier 5, the data/synchronizing signal separation circuit 6 having a PLL (Phase Locked Loop) 8 containing a VCO (Voltage Controlled Oscillator), a data decode error correction circuit 9 for inputting and decoding the data separated by the data/synchronizing signal separation circuit 6, making the error check for the decoded data, and making the error correction to output the correct data, when any error is included in the data, and an AV decode circuit 10 for inputting and decoding the correct data from the data decode error correction circuit 9 and outputting a video signal and an audio signal.

The optical disk reproducing apparatus further includes a mirror detection circuit 7 for counting a mirror face by detecting a mirror signal included in the RF signal from the RF amplifier 5 and indicating a mirror face where no tracks are formed on the optical disk, a tracking error detection circuit 11 for detecting a tracking error signal included in the reproducing signal from the optical pickup 3, a focus error detection circuit 12 for detecting a focus error signal included in the reproducing signal from the optical pickup, and a track cross detection circuit 13 for detecting a track cross on the basis of the tracking error signal from the tracking error detection circuit 11 to output a track pulse.

The optical disk reproducing apparatus further includes a control circuit 14 for controlling each of the above circuits under the control of a CPU 15 for performing the overall processing of the entire apparatus. This control circuit 14 includes a tracking servo-off part adapted to turn off the tracking servo that controls the tracking of the optical pickup 3 over the optical disk 1 after confirming that a laser beam is normally focused on the optical disk 1 on the basis of the focus error signal included in the reproducing signal output from the optical pickup 3, first count value calculating part 142 adapted to calculate an initial track count value by counting, for a predetermined time, the track pulses corresponding to the tracking error signal included in the reproducing signal output from the optical pickup 3 when the tracking servo-off part 141 turns off the tracking servo, and second count value calculating part 143 adapted to calculate a braking time track count value by counting, for a predetermined time, the track pulses corresponding to the tracking error signal included in the reproducing signal output from the optical pickup 3 when a brake signal is applied to the spindle motor 2.

The control circuit 14 further includes rotational direction detecting part 144 adapted to detect a rotational direction of the optical disk 1 by comparing the initial track count value calculated by the first count value calculating part 142 and the braking time track count value calculated by the second count value calculating part 143. The control circuit 14 applies a brake signal to the spindle motor 2 in an opposite rotational direction when the rotational direction detecting part 144 detects that the optical disk 1 is rotating in positive direction in braking the optical disk 1, and applies the brake signal to the spindle motor 2 in a positive rotational direction when the rotational direction detecting part detects that the optical disk 1 is reversely rotated.

Figure 2:
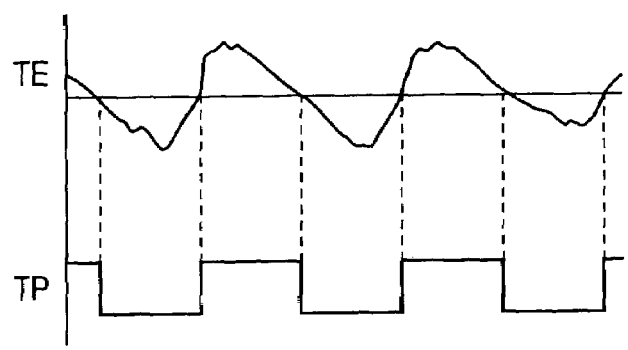
FIG. 2 is a signal waveform chart showing a tracking error signal when a tracking servo is turned off and the track pulses corresponding to the tracking error signal.

FIG. 2 is a signal waveform chart showing a tracking error signal TE when the tracking servo is turned off and a track pulses TP corresponding to the tracking error signal TE. The tracking error signal TE is output from the optical pickup 3 in reproducing the optical disk 1, when the tracking servo is turned off. The tracking pulses TP are produced corresponding to the tracking error signal TE to detect the number of tracks on the optical disk 1 scanned by the outgoing beam of the optical pickup 3.

Figure 3:
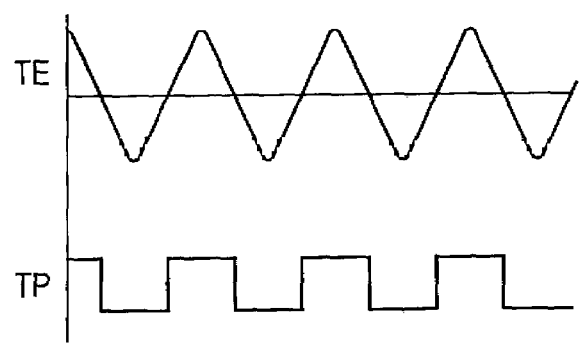
FIG. 3 is a signal waveform chart showing a tracking error signal included in a reproducing signal output from the optical pickup when the tracking servo is turned off and the track pulses corresponding to the tracking error signal.

FIG. 3 is a signal waveform chart showing a tracking error signal TE included in a reproducing signal output from the optical pickup 3 when the tracking servo is turned off and a track pulses TP corresponding to the tracking error signal TE. A count value obtained by counting the track pulses TP for a predetermined time is stored as an initial track count value A in a memory (not shown) of the control circuit 14.

Figure 4:
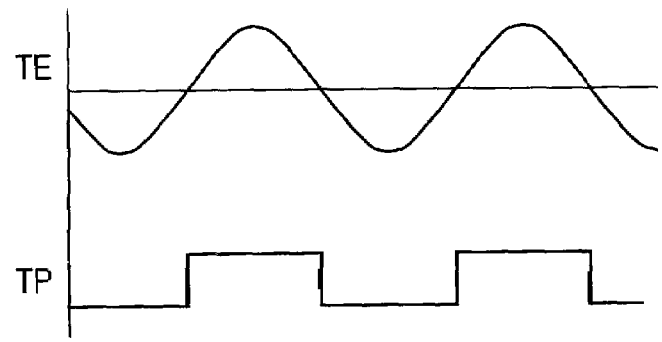
FIG. 4 is a signal waveform chart showing a tracking error signal included in a reproducing signal output from the optical pickup when a brake signal is applied to the spindle motor while the optical disk is being positively rotated and the track pulses corresponding to the tracking error signal in the embodiment.

FIG. 4 is a signal waveform chart showing a tracking error signal TE included in a reproducing signal output from the optical pickup 3 when the brake signal is applied to the spindle motor 2 while the optical disk is being positively rotated and a track pulses TP corresponding to the tracking error signal TE. A count value obtained by counting the track pulses TP for a predetermined time is stored as a braking time track count value B in the memory of the control circuit 14. In this case, the braking time count value B is smaller than the initial track count value A (see FIGS. 3 and 4).

Figure 5:
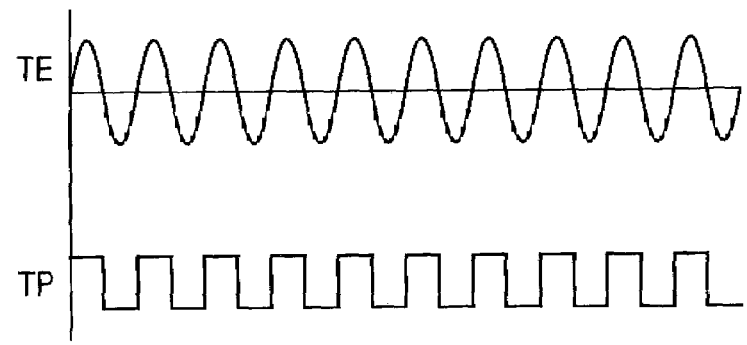
FIG. 5 is a signal waveform chart showing a tracking error signal included in a reproducing signal output from the optical pickup when a brake signal is applied to the spindle motor while the optical disk is being reversely rotated and the track pulses corresponding to the tracking error signal in the embodiment.

FIG. 5 is a signal waveform chart showing a tracking error signal TE included in a reproducing signal output from the optical pickup 3 when the brake signal is applied to the spindle motor 2 while the optical disk 1 is being reversely rotated and the track pulses TP corresponding to the tracking error signal TE. A count value obtained by counting the track pulses TP for a predetermined time is stored as a braking time track count value B in the memory of the control circuit 14. In this case, the braking time count value B is larger than the initial track count value A (see FIGS. 3 and 5). The reason that the braking time value B becomes larger than the initial track count value A is that the brake signal acts on the optical disk 1 being positively rotated in a direction of braking but acts on the optical disk 1 being reversely rotated in a direction of increasing the reverse rotation speed (see FIGS. 3 and 5).

Figure 6:
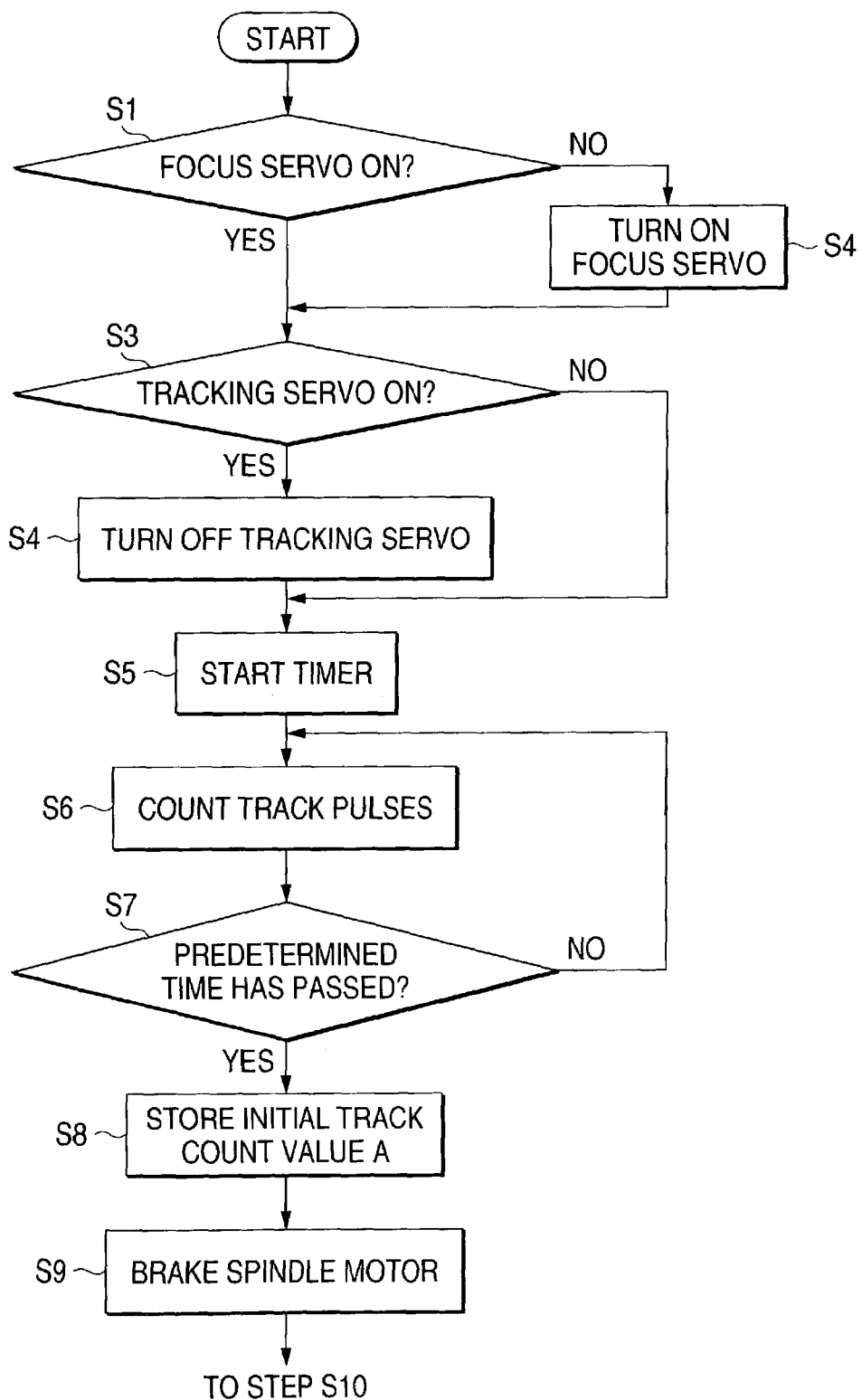
FIG. 6 is a flowchart showing a run-away handling process when the optical disk runs away.
Figure 7:
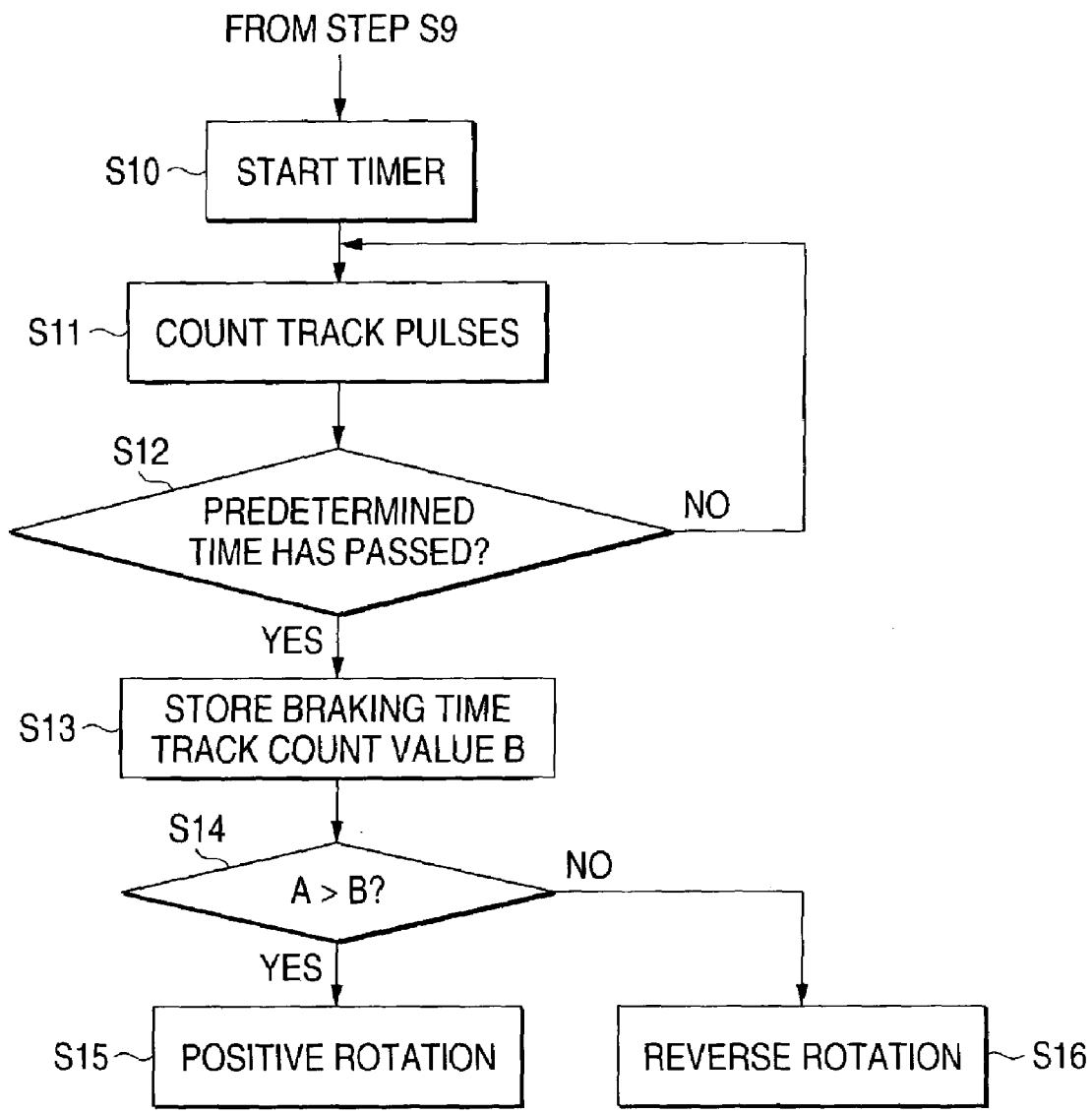
FIG. 7 is a flowchart showing a handling process when the optical disk runs away, continued from the flowchart of FIG. 6.

FIGS. 6 and 7 are flowcharts showing a run-away handling process when the optical disk 1 runs away. When the optical pickup 3 does not detect a synchronizing signal from the optical disk 1 due to some cause, and the CPU 15 cannot control the speed of the spindle motor 3 via the control circuit 14, the spindle motor 3 is accelerated to run away, so that the optical disk 1 runs away.

When the run-away of the optical disk is detected due to an absence of the synchronizing signal, the control circuit 14 performs the following processing by employing the tracking servo-off part 141, the first count value calculating part 142, the second count value calculating part 143, and the rotational direction detecting part 144.

First of all, a determination is made whether or not the focus servo is turned on to control the focus of a laser beam onto the optical disk 1 on the basis of a focus error signal included in a reproducing signal output from the optical pickup 3 (step S1) When the focus servo is not turned on, the focus servo is turned on, and the focus of the optical disk 1 is set up at a normal position (step S2).

After confirming that the focus of laser beam is set up at the normal position in the above way, a determination is made whether or not the tracking servo is turned on to control the tracking of the optical pickup 3 over the optical disk 1 (step S3). When the tracking servo is turned on, the tracking servo is turned off (step S4).

Thereafter, a timer is started (step S5). The track pulses corresponding to the tracking error signal included in the reproducing signal output from the optical pickup 3 are counted for a predetermined time (steps S6 and S7). The initial track count value A is calculated and stored in the memory (step S8).

Then, a brake signal is applied to the spindle motor 2 to brake the spindle motor 2 (step S9). The timer is started (step S10). The track pulses corresponding to the tracking error signal included in the reproducing signal output from the optical pickup 3 are counted for a predetermined time (steps S11 and S12). The braking time track count value B is calculated and stored in the memory (step S13).

Thereafter, the rotational direction of the optical disk 1 is detected by comparing the initial track count value A and the braking time track count value B (step S14). When the initial track count value A is larger than the braking time track count value B, it is determined that the optical disk 1 is positively rotated (step S15), and when the braking time track count value B is larger than the initial track count value A, it is determined that the optical disk 1 is reversely rotated (step S15).

After confirming the rotational direction of the optical disk 1 in the above way, the control circuit 14 applies a brake signal to the spindle motor 2 via the spindle circuit 19 to stop a run-away of the optical disk 1. That is, when the optical disk 1 runs away in the positive rotation direction, a brake signal in the reversely rotational direction is applied to the spindle motor 2, and when the optical disk 1 runs away in the reverse rotation direction, a brake signal in the positively rotational direction is applied to the spindle motor 2 to stop the optical disk 1.

As described above, according to the embodiment, when a run-away phenomenon of the optical disk 1 occurs because the spindle motor 2 runs away, the CPU 15 can detect promptly the rotational direction of the optical disk 1 at a high detection precision on the basis of the track count value without employing the current or voltage level of the spindle motor 2, even if the rotational direction of the optical disk is unknown. Therefore, the optical disk 1 that runs away can be stopped securely.

As described above, according to a first aspect of the invention, when a run-away phenomenon of the optical disk occurs, the tracking servo is turned off after confirming that a focus of the laser beam on the optical pickup is normally set up, whereby the rotational direction of the optical disk that runs away is detected by comparing the initial track count value and the braking time track count value, wherein the initial track count value is calculated by counting, for a predetermined time, the tracking pulses corresponding to the tracking error signal included in the reproducing signal output from the optical pickup, and the braking time track count value is calculated by counting, for a predetermined time, the tracking pulses corresponding to a tracking error signal included in the reproducing signal output from the optical pickup when the brake signal is applied to the spindle motor.

When it is detected that the optical disk is positively rotated, the brake signal is applied to the spindle motor in the opposite rotational direction, and when it is detected that the optical disk is reversely rotated, the brake signal is applied to the spindle motor in the positive rotational direction. As a result, the spindle motor is driven in braking to stop the optical disk securely.

Accordingly, in the first aspect of the invention, when the run-away phenomenon of the optical disk occurs when the spindle motor runs away, the rotational direction of the optical disk can be promptly detected, employing the track count values, without detecting the current or voltage level of the spindle motor, even if the CPU misses the rotational direction of the optical disk. Therefore, a detection precision of the rotational direction is high and the optical disk that runs away can be stopped securely. Also, since the rotational direction of the optical disk is detected employing the track count values, it is possible to provide an optical disk reproducing apparatus without need for providing a rotation detecting sensor separately, with a simple constitution and a lower cost.

According to a second aspect of the invention, when the run-away phenomenon of the optical disk occurs, the rotational direction of the optical disk is detected on the basis of the track relevant information output from the optical pickup, and then a brake signal in a direction opposite to the detected rotational direction is applied to the spindle motor. Therefore, when the run-away phenomenon of the optical disk occurs when the spindle motor runs away, the rotational direction of the optical disk can be promptly detected, employing the track relevant information, without detecting the current or voltage level of the spindle motor, even if the CPU misses the rotational direction of the optical disk. Accordingly, the detection precision of the rotational direction is high and the optical disk that runs away can be stopped securely. Also, since the rotational direction of the optical disk is detected employing the track relevant information, it is possible to provide an optical disk reproducing apparatus without need for providing a rotation detecting sensor separately, with a simple constitution and a lower cost.

According to a third aspect of the invention, in addition to the second aspect of the invention, the rotational direction of the optical disk is detected by comparing the initial track count value and the braking time track count value, wherein the initial track count value is obtained by counting, for a predetermined time, the tracking pulses corresponding to the tracking error signal included in the reproducing signal output from the optical pickup, and the braking time track count value is obtained by counting, for a predetermined time, the tracking pulses corresponding to a tracking error signal included in the reproducing signal output from the optical pickup, when the brake signal is applied to the spindle motor. Therefore, when the run-away phenomenon of the optical disk occurs when the spindle motor runs away, the rotational direction of the optical disk can be promptly detected, employing the track count values, without detecting the current or voltage level of the spindle motor, even if the CPU misses the rotational direction of the optical disk.

According to a fourth aspect of the invention, in addition to the second aspect of the invention, the control circuit includes: a first count value calculating section adapted to calculate an initial track count value by counting, for a predetermined time, tracking pulses corresponding to a tracking error signal included in the reproducing signal, when a tracking servo is turned off; a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor; and a rotational direction detecting section adapted to detect a rotational direction of the optical disk by comparing the initial track count value calculated by the first count value calculating section and the braking time track count value calculated by the second count value calculating section, wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated. Therefore, when the run-away phenomenon of the optical disk occurs when the spindle motor runs away, the rotational direction of the optical disk can be promptly detected, employing the track count values, without detecting the current or voltage level of the spindle motor, even if the CPU misses the rotational direction of the optical disk. Accordingly, the optical disk that runs-away can be stopped securely.

According to a fifth aspect of the invention, in addition to the second aspect of the invention, the control circuit includes: a tracking servo-off section adapted to turn off a tracking servo that controls a tracking of the optical pickup after confirming that a focus of the laser beam on said optical pickup is normally set on the basis of a focus error signal included in the reproducing signal; a first count value calculating section adapted to calculate an initial track count value by counting, for a predetermined time, tracking pulses corresponding to a tracking error signal included in the reproducing signal, when the tracking servo-off section turns off the tracking servo; a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor; a rotational direction detecting section adapted to detect a rotational direction of the optical disk by comparing the initial track count value calculated by the first count value calculating section and the braking time track count value calculated by the second count value calculating section; and a control circuit adapted to control the spindle motor on the basis of a synchronizing signal included in the reproducing signal, wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated. Therefore, when the runaway phenomenon of the optical disk occurs when the spindle motor runs away, the rotational direction of the optical disk can be promptly detected, employing the track count values, without detecting the current or voltage level of the spindle motor, even if the CPU misses the rotational direction of the optical disk. Accordingly, the optical disk that runs away can be stopped securely.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk reproducing apparatus comprising:
   a spindle motor adapted to rotate an optical disk;
   an optical pickup adapted to emit a laser beam for reproducing information recorded on the optical disk, to receive a reflected light from the optical disk and to output a reproducing signal;
   a tracking servo-off section adapted to turn off a tracking servo that controls a tracking of the optical pickup after confirming that a focus of the laser beam on said optical pickup is normally set on the basis of a focus error signal included in the reproducing signal;
   a first count value calculating section adapted to calculate an initial track count value by counting, for a predetermined time, tracking pulses corresponding to a tracking error signal included in the reproducing signal, when the tracking servo-off section turns off the tracking servo;
   a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor;
   a rotational direction detecting section adapted to detect a rotational direction of the optical disk by comparing the initial track count value calculated by the first count value calculating section and the braking time track count value calculated by the second count value calculating section; and
   a control circuit adapted to control the spindle motor on the basis of a synchronizing signal included in the reproducing signal,
   wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated.

2. An optical disk reproducing apparatus comprising:
   a spindle motor adapted to rotate an optical disk;
   an optical pickup adapted to emit a laser beam for reproducing information recorded on the optical disk, to receive a reflected light from the optical disk and to output a reproducing signal; and
   a control circuit adapted to control the spindle motor on the basis of a synchronizing signal included in the reproducing signal,
   wherein when the spindle motor is accelerated and the optical disk runs away, the control circuit detects a rotational direction of the optical disk based on a track count information output from the optical pickup and applies a brake signal to the spindle motor in a direction opposite to the detected rotational direction of the optical disk.

3. The apparatus as claimed in claim 2, wherein the control circuit detects the rotational direction by comparing an initial track count value, which obtained by counting tracking pulses corresponding to a tracking error signal included in the reproducing signal for a predetermined time, and a braking time track count value, which obtained by counting the tracking pulses for a predetermined time when a brake signal is applied to the spindle motor.

4. The apparatus as claimed in claim 2, wherein the control circuit comprises:
   a first count value calculating section adapted to calculate an initial track count value by counting, for a predetermined time, tracking pulses corresponding to a tracking error signal included in the reproducing signal, when a tracking servo is turned off;
   a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor; and
   a rotational direction detecting section adapted to detect a rotational direction of the optical disk by comparing the initial track count value calculated by the first count value calculating section and the braking time track count value calculated by the second count value calculating section,
   wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated.

5. The apparatus as claimed in claim 2, wherein the control circuit comprises:

a tracking servo-off section adapted to turn off a tracking servo that controls a tracking of the optical pickup after confirming that a focus of the laser beam on said optical pickup is normally set on the basis of a focus error signal included in the reproducing signal;

a first count value calculating section adapted to calculate an initial track count value by counting, for a predetermined time, tracking pulses corresponding to a tracking error signal included in the reproducing signal, when the tracking servo-off section turns off the tracking servo;

a second count value calculating section adapted to calculate the track count value when a braking is applied to the optical disk, by counting, for a predetermined time, the tracking pulses corresponding to a tracking error signal included in the reproducing signal, when a brake signal is applied to the spindle motor;

a rotational direction detecting section adapted to detect a rotational direction of the optical disk by comparing the initial track count value calculated by the first count value calculating section and the braking time track count value calculated by the second count value calculating section; and a control circuit adapted to control the spindle motor on the basis of a synchronizing signal included in the reproducing signal, wherein when the spindle motor is accelerated and the optical disk runs away due to an absence of the synchronizing signal, the control circuit applies a brake signal to the spindle motor in an opposite rotational direction when the rotational direction detecting section detects that the optical disk is positively rotated, and applies the brake signal to the spindle motor in a positive rotational direction when the rotational direction detecting section detects that the optical disk is reversely rotated.

* * * * *